N. EARLYWINE.
Improvement in Cultivators.

No. 127,469. Patented June 4, 1872.

WITNESSES:
Robert Burns.
J. W. Herthel.

INVENTOR
Nathan Earlywine
per Herthel & Co
attys.

UNITED STATES PATENT OFFICE.

NATHAN EARLYWINE, OF CENTREVILLE, IOWA, ASSIGNOR TO HIMSELF AND CHARLES A. DAVIS, OF ST. LOUIS, MISSOURI.

IMPROVEMENT IN CULTIVATORS.

Specification forming part of Letters Patent No. 127,469, dated June 4, 1872.

*To all whom it may concern:*

Be it known that I, NATHAN EARLYWINE, of Centreville, in the county of Appanoose and State of Iowa, have made a certain new and useful Improved Cultivator; and I do hereby declare that the following is a full and true description thereof, reference being had to the accompanying drawing and to the letters of reference marked thereon.

The chief object of this invention is to form an improved cultivator adapted for use in the Southern States for purposes of planting sugar and cultivating cotton, corn, sugar, &c., as well as being generally applicable as a cultivator for regular or irregular soil.

It is well known that cotton, corn, and sugar planted upon ridges to be properly cultivated require the ground or soil to be thrown up or down both sides of the ridges to and from the top, and otherwise that the clogs or lumps of soil should be broken or harrowed and freed from obstructions. To more properly effect this purpose the general nature of this invention consists in hinging the bars that carry the cultivator-teeth in such a manner that any required inclination can be given to the teeth, or the same be adjusted in accordance to the nature of the ridge or soil, in manner now to be more fully described.

To enable those herein skilled to make and use my said improvement, I will now more fully describe the same, referring to—

Figure 1:
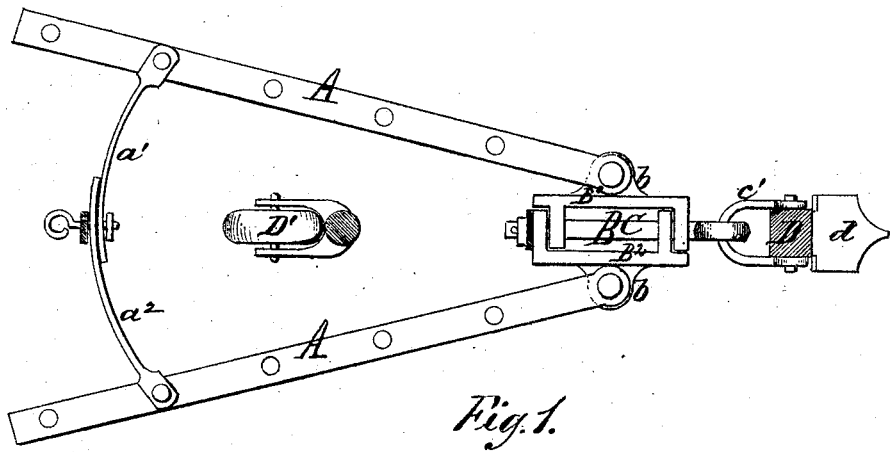
Figure 2:
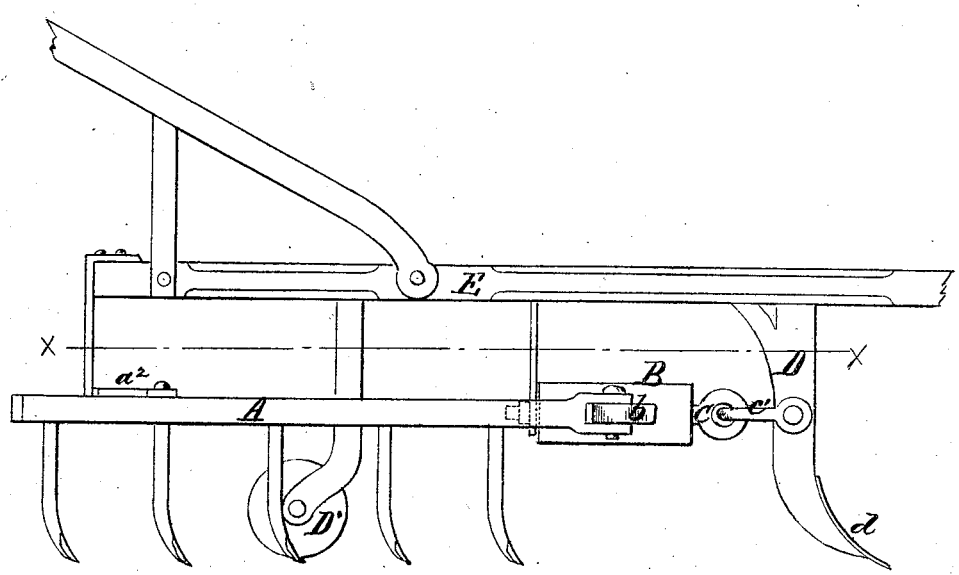

Figure 1 as a sectional plan at line $x$ $x$; to Fig. 2 as a side elevation.

The bars A are provided with cultivator-teeth in any proper manner. At the front the bars A are pivoted to the side lugs $b$ of a hinge, B. In order to allow the bars A to swing or fold up vertically the hinge B consists of the hinge parts $B^1$ $B^2$, properly pivoted by means of a connecting-rod, C, as shown in Fig. 1. The pivoting of the bars A to the lugs $b$ of the hinge also allows for the expanding or contracting of the bars in a horizontal direction, the said bars being held in position by locking-bars $a^1$ $a^2$, as shown in Fig. 1. In front is arranged the plow-standard D, to which is secured the plow-point $d$, and, further, the hinge B by link $c'$. A caster-roller, D', is arranged back of the plow-point, and in line with same, so as to break the lumps, and, at the same time, prepare the top furrow. The plow-frame E with its plow-handles is supported by the plow-standard D and roller D'.

The peculiar construction of the hinge B readily permits any required inclination to be given to the cultivator. Thus, cultivating on ridges being accomplished by adjusting the cultivator so that the front teeth cultivate near top of the ridge, while the remaining part of teeth or cultivator, being inclined along the side of the ridge, the whole sides or width of the ridge is embraced. At the same time the plow-point $d$ readily opens the top furrow, and the roller, following, breaks the clogs and otherwise smooths and prepares the bottom for planting purposes. The locking-bars $a^1$ $a^2$ permit side adjustment to accommodate the ridges, and also retain the cultivator in steady position.

By firmly bracing by chain attachments the roller, and adjusting the cultivator as required, the same is adapted for regular or irregular soil.

Having thus fully described my said invention, what I claim is—

The hinge B, constructed as described, in combination with bars A, locking-bars $a^1$ $a^2$, standard D, roller D', plow-frame E, when arranged to operate as and for the purpose set forth.

In testimony of said invention I have hereunto set my hand.

NATHAN EARLYWINE.

Witnesses:
 WILLIAM W. HERTHEL,
 ROBERT BURNS.